Figure 9:
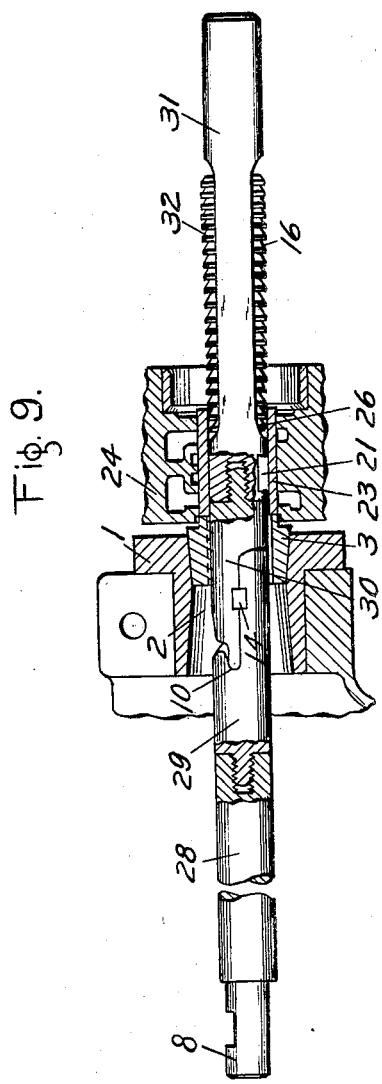

July 11, 1939.  T. MAXWELL  2,165,977
BROACHING DEVICE
Filed May 26, 1936  2 Sheets-Sheet 1
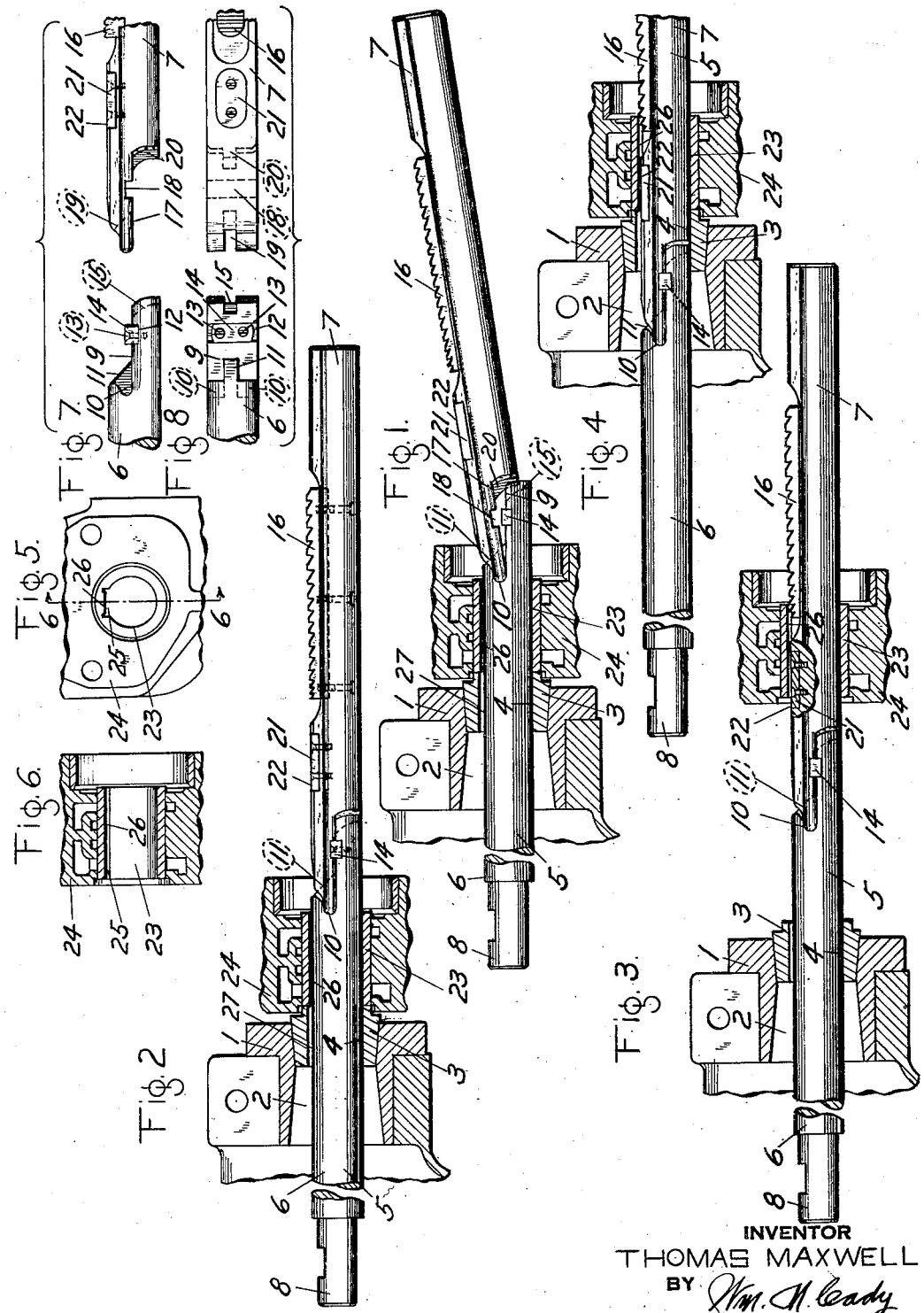
INVENTOR
THOMAS MAXWELL
BY Wm. N. Cady
ATTORNEY July 11, 1939.  T. MAXWELL  2,165,977
BROACHING DEVICE
Filed May 26, 1936  2 Sheets-Sheet 2

INVENTOR
THOMAS MAXWELL
BY *Wm. N. Cady*
ATTORNEY

Patented July 11, 1939

2,165,977

UNITED STATES PATENT OFFICE 2,165,977

BROACHING DEVICE

Thomas Maxwell, Pittsburgh, Pa., assignor to The Westinghouse Air Brake Company, Wilmerding, Pa., a corporation of Pennsylvania Application May 26, 1936, Serial No. 81,856

8 Claims. (Cl. 90—33)

This invention relates to the method of and the means for broaching one or more interior surfaces of a tubular member such as the bushing of a triple valve device or an emergency valve device of a fluid pressure brake equipment.

The bushing of either of such devices is first secured to the casing of the device, preferably by a press fit, before being subjected to the broaching operation.

The means heretofore employed for broaching the bushing comprises a stationary draw-head having a central tapered bore in which the inner tapered end of a bushing is secured by a press fit. The bushing is provided with a longitudinally extending sleeve portion which is crescent shaped in cross-section and which is of a length at least equal to the length of the bushing to be broached. The outside diameter of the sleeve portion is slightly less than that of the inside diameter of the bushing to be broached and the interior diameter of the sleeve portion is slightly greater than the diameter of the broaching bar which is adapted to be moved back and forth through the sleeve portion and which is slidably guided by the bushing. The broaching bar is provided at one end with broaching teeth and is provided at the other end with means whereby the bar is adapted to be operatively connected to the mechanism (not shown) for imparting reciprocatory movement to the bar relative to the sleeve portion, the slot in the sleeve portion permitting the broaching teeth to move through the sleeve when the bar is reciprocated.

When it is desired to broach the bushing of a valve device, the broaching bar is first moved to its outer position, then the casing is applied over the free outer end of the bar and when so placed, is moved manually along the bar to the bushing secured to the draw head, the inside diameter of the bushing carried by the casing of the valve device being great enough to permit this bushing to clear the broaching teeth carried by the bar. The operator now raises the casing relative to the bar into endwise registration with the sleeve portion of the bushing carried by the draw-head and when in such registration slides the bushing a short distance on the sleeve portion. The operator now causes the bar to start its broaching stroke and as the broaching teeth approach the bushing carried by the casing the casing is positioned by the operator to insure the registration of the surface to be broached with the broaching teeth. After the broaching teeth are in cutting relation with the surface to be broached, the continued movement of the broaching bar causes the casing and bushing to move into engagement with the draw-head following which the teeth of the bar are caused to broach the bushing which is being held stationary by the draw-head.

After the broaching bar has been moved completely beyond the bushing just broached the operator removes the casing from the sleeve portion of the bushing carried by the draw-head and following this causes the broaching bar to be returned to its outer position and then places another casing in position for broaching the bushing thereof.

It will here be understood that in order to accurately broach the bushing carried by the casing there should be no radial lost motion between the bushing carried by the draw-head and the bushing carried by the casing nor should there be such lost motion between the broaching bar and the bushing carried by the draw-head. When the bushing carried by the draw-head is new there will be no such lost motion but after the bushing has been in use for some time the inner and outer surfaces thereof as well as the bar wear and such lost motion develops and as a consequence the worn bushing must be replaced by a new one and in case the broaching bar is badly worn it must also be replaced by a new one. Since the bushings carried by the draw-head have to be so accurately formed they were very expensive.

Another objectionable feature of such a bushing is that since it must fit the bushing to be broached snugly it is often the case when the bushing is new that the frictional engagement between the sleeve portion of the bushing carried by the casing and a bushing just broached will be so great that the operator cannot remove the broached bushing from the sleeve portion without the use of a prying tool. This is of course objectionable for the reason that it consumes time and is liable to cause the broached bushing or the casing carrying the bushing to be damaged.

It is very desirable to heat treat the broaching bar so as to render it tougher and more wear resisting, but since the bar heretofore used was very long and of small diameter, heat treating of the bar was very difficult and costly due to the warping of the bar under such treatment.

The principal object of the present invention is to provide an improved method and means for broaching the interior surface of a tubular member which will be free of the above mentioned objectionable features.

Another object of the invention is to provide broaching means comprising a broaching bar and in which the member to be broached forms a guide bearing for the bar during its broaching movement.

Other objects and advantages will appear in the following more detailed description of the invention.

In the accompanying drawings, Figs. 1, 2, 3 and 4 are each a fragmentary longitudinal sectional view of a broaching device embodying the invention, Fig. 1 showing the broaching bar in the course of assembly, Fig. 2 showing the bar assembled, Fig. 3 showing the bar assembled and the member to be broached positioned preparatory to broaching, and Fig. 4 showing the bar in position to begin its broaching operation. Fig. 5 is a fragmentary end elevational view of a valve device to be broached, and Fig. 6 is a longitudinal sectional view through the same taken on the line 6—6 of Fig. 5. Fig. 7 is a fragmentary side elevational view of a portion of the broaching bar, the parts of the bar being shown separated, and Fig. 8 is a plan view of the same. Fig. 9 is a view similar to Fig. 4 but showing a modification of the broaching bar.

As shown in the drawings the broaching means may comprise a stationary draw-head 1 having a bore 2 in which a stationary abutment 3 is secured by a press fit, said abument having a central bore 4 through which a broaching bar 5 is adapted to pass.

The broaching bar shown in Figs. 1 to 4 and 7 and 8 comprises sections 6 and 7 which are adapted to be operatively connected together in longitudinal alignment as will be hereinafter more fully described.

The section 6 at its inner end is provided with a notched portion 8 which is adapted to be operatively connected in the usual manner to a driving mechanism for moving the section back and forth relative to the draw-head 1. The driving mechanism may be the same as that employed heretofore and for this reason it is deemed unnecessary to show and describe it here.

The upper portion of the other end of the section 6 is cut away for a short distance to form a plain face 9 which is disposed horizontally in substantially the same plane as the axis of the bar. Adjacent the rear end of the surface 9 the section is provided with laterally spaced recesses 10 which are separated by a short tapering web 11 which extends longitudinally of the section toward its outer end. The surface 9 is provided with a laterally extending groove 12 in which there is secured, by means of countersunk machine screws 13, a draw plate 14 which for a portion of its thickness extends above the surface 9. This plate is preferably of hardened steel. The section 6 at its extreme outer end is provided with a vertically extending groove 15.

The section 7 of the broaching bar is provided intermediate its ends with a toothed cutter or broaching element 16 which is secured along the upper side of the bar by means of countersunk machine screws (not shown) in the usual manner.

The underside of the inner end of the section 7 is cut away to form a plain surface 17 which corresponds with the surface 9 of the section 6. The surface 17 is provided with a laterally extending notch 18 which, as will hereinafter more fully appear is for the reception of the draw plate 14. The extreme inner end of the section 7 is provided with a vertical notch 19 and on each side of the notch the extreme end of the section is curved and otherwise shaped for reception within the spaced recesses 10 of the section 6, the notch 18 being adapted to accommodate the web 11. At one end of the offset portion of the section 7 there is provided a vertically disposed lug 20 which is adapted to be received in the groove 15.

The section 7, on its upper side and intermediate one end of the broaching element and the offset portion of the section, is provided with a recess in which there is secured a guide plate 21 preferably of hardened steel. The plate 20 is horizontally disposed and has a plain outer face 22 which is tangential with the outer periphery of the section. The side edges of the plate are exposed and are adapted to slidably engage the sides of a slide valve seat recess in the bushing which is to be broached as will hereinafter more fully appear.

As shown in detail in Figs. 5 and 6 of the drawings, the bushing 23 which is to be broached is of tubular form and is secured by a press fit to the casing 24 of a brake controlling valve device for a fluid pressure brake equipment. The interior surface of the bushing is provided with a wide groove 25 in which there is formed a slide valve seat 26 which is to be broached or cut away to its proper height.

The method of broaching the slide valve seat is as follows: With the section 6 of the broaching bar in the position in which it is shown in Fig. 1, the casing 24 carrying the bushing 23 is first placed over the free end of the section and then moved toward the left along the section to the position in which it is shown. With the casing in this position the offset end portion of the bar section projects beyond the right hand end of the bushing 23. The operator now places the section 7 of the bar in the position in which it is shown in Fig. 1. In this position the spaced rounded ends of the section are within the accommodating recesses 10 of the section 6 and the sides of notch 19 are in slidable engagement with the sides of the web 11 so that the section 7 cannot be moved laterally or rotated relative to the section 6. The section 7 is now lowered to the position in which it is shown in Fig. 2 in which position the draw plate 14 of the section 6 engages the section 7 within the notch 18. In this position the sides of the lug 20 on the section 7 are in slidable engagement with the side walls of the notch 15 of the section 6. It will here be noted that the section 7 is so interlocked with the section 6, by means of the draw plate 14, wall 11 and lug 20, that it cannot rotate or move laterally relative to the section 6. It will also be noted that when the faces 9 and 17 of the sections 6 and 7 respectively are in engagement, the engagement of the section 7 by the section 6 within the recesses 10 prevent the section 7 from moving downwardly relative to the section 6. In short the interengagement between the sections 6 and 7 is such as to maintain the part 7 in axial alignment with the part 6 until such time as it is desired to remove the section 7 as will hereinafter more fully appear.

With the sections 6 and 7 of the broaching bar assembled as just described, the operator moves the casing 24 and thereby the bushing 23 along the bar from the position in which it is shown in Fig. 2 to the position in which it is shown in Fig. 3. As the casing and bushing are being moved to this position the operator positions the casing and bushing so that the groove 25 and guide plate 21 are in longitudinal registration, after which the casing and bushing are moved to the position shown. In this position the guide plate engages the sides of the groove 25 and one or more of the teeth of the broaching element are in engagement with the seat 26 of the bushing.

The broaching bar is now caused to be moved toward the left hand and as it is thus moved the broaching teeth due to their engagement with the seat 26 of the bushing cause the casing 24 and bushing to move with the bar.

Now when the casing and bushing are brought to a stop by the engagement of the left hand end of the bushing by the stationary abutment 3 carried by the draw-head 1, the continued movement of the bar toward the left causes the teeth of the broaching bar to be drawn over the slide valve seat 26. The broaching teeth increase in length toward the free end of the section 7 so that as they move relative to the bushing 23 they cut the slide valve seat 26 to the desired height.

After the broaching teeth have passed through the bushing the movement of the bar toward the left hand is continued until the end of the section 7 has cleared the bushing whereupon the casing will drop by the force of gravity away from the draw-head 1 into the hands of the operator or any suitable work catcher.

It will here be understood that when the broaching bar moves relative to the casing, i. e., while the broaching teeth are cutting the slide valve seat 26 and during the subsequent movement of the bar to the limit of its broaching stroke, the bushing being broached, serves as a guide bearing for the bar, and since there is no appreciable wear of the bushing each slide valve 26 will be accurately broached.

The abutment 3 is provided with a groove 27 which is of such a width and depth as to permit the free passage therethrough of the guide plate 21 and teeth of the broaching element 16.

After the broaching operation has been completed, the broaching bar is moved to its outer position as shown in Fig. 1 and in this position the section 7 is removed from the section 6 by first raising the section and then moving it toward the right relative to the section 6. The bar is now in condition for the mounting of another casing and bushing to be broached.

In Fig. 9 a modified broaching bar is illustrated which differs from the bar shown in Figs. 1 to 4 inclusive and 7 and 8 in that it comprises four axially aligned parts instead of two, and comprises broaching elements secured to the top and bottom sides of the bar instead of on the top only. The four parts of the bar are indicated by the reference characters 28, 29, 30 and 31. The adjacent ends of the parts 28 and 29 have screw-threaded connection with each other and in effect are equivalent to the section 6 of the bar shown in Figs. 1 to 4 inclusive and 7 and 8, and the adjacent ends of the parts 30 and 31 are similarly connected and in effect are equivalent to the section 7.

The part 31 of the bar is provided on its lower side with the broaching element 16 for finishing the slide valve seat and on its upper side is provided with two laterally spaced parallel broaching elements 32, only one of which is seen in Fig. 9, but which are adapted to cut spaced grooves in the bushing for the reception of spaced lugs with which some slide valves are provided.

The advantage to be derived in making the bar in four pieces instead of in two pieces is that the length of the bar may be varied by substituting for either the parts 28 or 31 or both longer or shorter sections as desired, thus the connection between the parts 29 and 30 will serve for a bar of any length.

The method of broaching a bushing with this modified broaching bar is the same as that described in connection with the broaching bar shown in Figs. 1 to 4 inclusive and 7 and 8.

It will be understood from the foregoing description that by reason of the broaching bar being made of two separable pieces that the bushing to be broached is adapted to form a guide for the bar, thus eliminating the expensive bronze bushing heretofore employed for supporting the member to be broached and for forming a guide for the broaching bar. Another advantage of this construction is that since the member to be broached does not have to clear the cutting teeth and the bushing to be broached forms a guide for the broaching bar the bar may be of considerably greater diameter than was heretofore possible for a bushing of given interior dimensions, thus providing a more rigid bar and therefore contributing to a more accurate broaching operation. Further by dividing the bar intermediate its ends the pieces to be heat treated will be considerably shorter than heretofore used and as a result, the pieces are not so liable to warp under such treatment as is the long one piece bar heretofore employed.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a broaching machine, in combination, a fixed draw-head, an abutment cooperating with said draw-head for engagement with a tubular member to be broached, a broaching bar adapted to be drawn longitudinally through said tubular member for broaching an interior surface of the member, said broaching bar comprising a section on which the tubular member is adapted to be placed and supported preparatory to being broached and also comprising a broaching section adapted to be attached to the first mentioned section while the tubular member is on the first mentioned section, said broaching section, when the tubular member is in engagement with said abutment, being movable through the member by the first mentioned section.

2. In a broaching machine, in combination, a fixed draw-head, an abutment cooperating with said draw-head for engagement with a tubular member to be broached, a longitudinally movable broaching bar comprising a pull section adapted to temporarily support said tubular member and also adapted to carry the tubular member into abutting engagement with said abutment, and a broaching section removably attached to said pull section in axial alignment therewith and for movement thereby for broaching an interior surface of the member when the member is in abutting engagement with said abutment, the point of attachment between said sections being located so as to be clear of said tubular member when the member is temporarily supported by the pull section.

3. In a broaching machine, in combination, a fixed draw-head, an abutment cooperating with said draw-head for engagement with a tubular member to be broached, a longitudinally movable broaching bar comprising a pull section and upon which said member is adapted to be placed and temporarily supported and also comprising a broaching section adapted to be operatively connected to said pull section in axial alignment therewith while the member to be broached is supported by the pull section, said broaching section being movable by said pull section relative to said member to broach the interior surface of the member when the member is in abutting engagement with said abutment.

4. In a broaching machine, in combination, a fixed draw-head, an abutment cooperating with said draw-head for engagement with a tubular member to be broached, a broaching bar adapted to be drawn longitudinally through said tubular member for broaching an interior surface of the member, said broaching bar comprising a pull section and a broaching section operatively connected together in axial alignment, said pull section being adapted to support said member preparatory to being broached and to carry the member into abutting engagement with said abutment, and said broaching section having cutting teeth for broaching said surface when the member is in abutting engagement with said abutment and being removable from said pull section to permit the tubular member to be positioned on the pull section without having to first clear any part of the broaching section.

5. In a broaching machine, in combination, a fixed draw-head, an abutment cooperating with said draw-head for engagement with a tubular member to be broached, a broaching bar adapted to be drawn longitudinally through said tubular member for broaching an interior surface of the member, said broaching bar comprising a pull section on which said member is adapted to be placed and thereby supported preparatory to being broached and also comprising a broaching section adapted to be operatively attached to said pull section in axial alignment therewith while the tubular member is in place on the pull section, cutting teeth on said broaching section adapted to broach said surface when the member is in abutting engagement with said abutment and the broaching bar is moved longitudinally, and means on said broaching section with which said member is adapted to cooperate to align the surface to be broached with said cutting teeth.

6. In a broaching machine, in combination, a fixed draw-head, an abutment cooperating with said draw-head for engagement with a tubular member to be broached, a broaching bar adapted to be drawn longitudinally through said tubular manner for broaching an interior surface of the member, said broaching bar comprising a pull section on which said member is adapted to be placed and thereby supported preparatory to being broached and also comprising a broaching section adapted to be operatively attached to said pull section in axial alignment therewith while the tubular member is in place on the pull section, cutting teeth on said broaching section adapted to broach said surface when the member is in abutting engagement with said abutment and the broaching bar is moved longitudinally, and means on said bar, located adjacent said cutting teeth, with which said member is adapted to cooperate to align the surface to be broached with the cutting teeth.

7. In a broaching machine, in combination, a fixed draw-head, an abutment cooperating with said draw-head for engagement with a tubular member to be broached, a broaching bar adapted to be drawn longitudinally through said tubular member for broaching an interior surface of the member, said broaching bar comprising a pull section on which said member is adapted to be placed and thereby supported preparatory to being broached and also comprising a broaching section adapted to be operatively attached to said pull section in axial alignment therewith while the tubular member is in place on the pull section, cutting teeth on said broaching section adapted to broach said surface when the member is in abutting engagement with said abutment and the broaching bar is moved longitudinally, and a plate removably secured to said broaching section with which said member is adapted to cooperate to align the surface to be broached with the cutting teeth.

8. In a broaching machine, in combination, a fixed draw-head, an abutment cooperating with said draw-head for engagement with a tubular member to be broached, a broaching bar adapted to be drawn longitudinally through said tubular member for broaching an interior surface of the member, said broaching bar comprising a pull section adapted to support the tubular member preparatory to being broached and adapted to carry the member into abutting engagement with said abutment, and also comprising a broaching section having broaching teeth adapted to broach said surface when the member is in engagement with said abutment and the broaching section is moved longitudinally through the member, said sections being separable to permit the placing of said member on the bar without having to be passed over said broaching teeth.

THOMAS MAXWELL.